No. 615,411. Patented Dec. 6, 1898.
G. M. PELTON.
ROLL.
(Application filed Jan. 31, 1898.)
(No Model.)
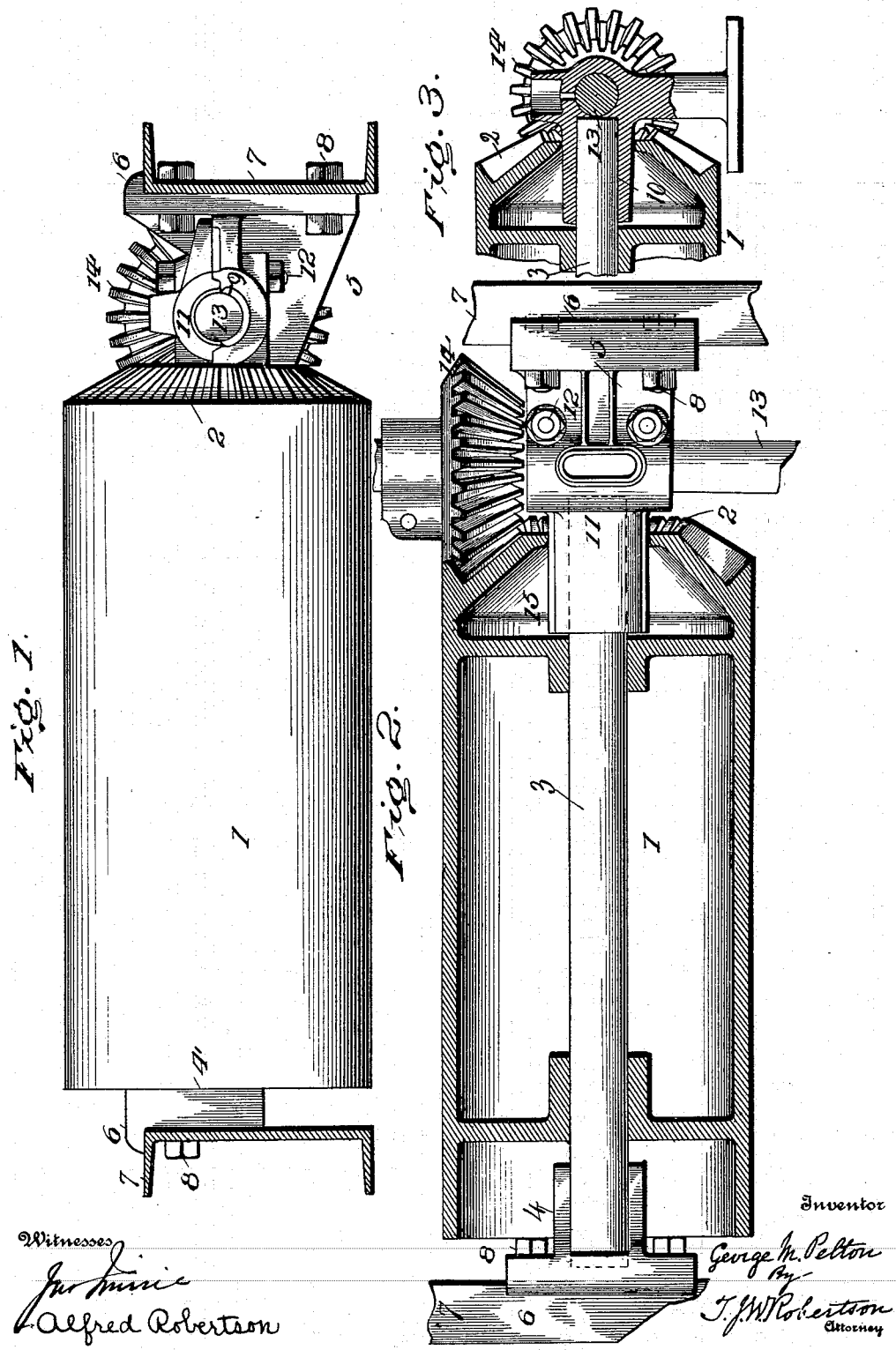
Witnesses
Jno Munic
Alfred Robertson
Inventor
George M. Pelton
By
T. J. W. Robertson
Attorney
THE NORRIS PETERS CO., PHOTO-LITHO., WASHINGTON, D. C.

United States Patent Office.

GEORGE M. PELTON, OF BELMONT, NEW YORK.

ROLL.

SPECIFICATION forming part of Letters Patent No. 615,411, dated December 6, 1898.

Application filed January 31, 1898. Serial No. 668,657. (No model.)

*To all whom it may concern:*

Be it known that I, GEORGE M. PELTON, a citizen of the United States, residing at Belmont, in the county of Allegany and State of New York, have invented a certain new and useful Improvement in Rolls, of which the following is a specification, reference being had to the accompanying drawings.

This improvement is designed more particularly to provide a "live roll" for sawmills, which will not only be found very advantageous in sawing machinery, but will also prove quite useful in other mechanism; and the invention consists in the peculiar construction hereinafter more particularly described and then definitely claimed at the end hereof.

In the accompanying drawings, Figure 1 is an elevation of a roll and its immediate connections constructed according to my invention, with parts represented as broken away. Fig. 2 is a plan of the same with the roll in horizontal section. Fig. 3 is a modified form of bearing.

Referring now to the details of the drawings by numerals, 1 is the roll, which is cast hollow, as represented in Fig. 2, and with a bevel-gear 2 cast integral with it.

3 indicates the shaft, to which the roll is secured in any convenient way and which is mounted in brackets 4 and 5 at its opposite ends, which are shown as provided with lips 6 to rest on channel-iron sills 7, to which they are secured by bolts 8; but the brackets may be provided with feet, if preferred, and the outer bearing, instead of having a cap, may be made in one piece, as shown in Fig. 3.

The bracket 5 has a bearing 9 at right angles to the bearing 10 of the roll-shaft, and is provided with a cap 11, covering both bearings 9 and 10, and which is secured to the bracket 5 by the bolts and nuts 12. The bearing 9 receives the shaft 13, which carries a bevel-gear 14, meshing with the gear 2, as shown.

It will be seen that the gear and roll are provided with recesses 15, which receive the bearings or inner ends of the brackets, which makes the whole arrangement more compact and tends to keep the bearings of the roll free from dust. It will also be seen that the edge of the roll overhangs the outer edges of the teeth of the bevel-gear 2, so that said bevel-teeth are partly within the roll. This also tends to compactness, as it allows the teeth of the other bevel-gear to project inside the roll, and besides this it serves to strengthen the teeth, and, reversely, the teeth strengthen the edge of the roll, the latter being supported by the outer ends of the teeth.

What I claim as new is—

1. A roller provided with a bevel-gear and having its acting surface extending over the outer ends of the teeth of said gear, substantially as described.

2. A roller provided with a bevel-gear whose teeth are formed within a recess in the roll, in combination with a second gear whose teeth work in said recess, substantially as described.

3. A roll provided with a bevel-gear whose back partially closes a recess in said roll and a bearing for the shaft of said roll entering said recess, substantially as described.

4. A roll provided with a bevel-gear whose back partially closes a recess in said roll, a bevel-gear meshing with said first-mentioned gear, shafts for said gears and roller, in combination with bearings for said shafts one of which enters said recess, and a single separable cap covering both of said shafts, substantially as described.

In testimony whereof I affix my signature, in the presence of two witnesses, this 29th day January, 1898.

GEORGE M. PELTON.

Witnesses:
 LEWIS W. ALLEN,
 D. A. VAN CAMPEN.